(12) United States Patent
Kyakuno et al.

(10) Patent No.: US 12,498,322 B2
(45) Date of Patent: Dec. 16, 2025

(54) CONTROL APPARATUS, TURBIDIMETER, DETERMINATION METHOD, AND LEARNING METHOD

(71) Applicant: Yokogawa Electric Corporation, Musashino (JP)

(72) Inventors: Toshihiko Kyakuno, Musashino (JP); Takeshi Kuwagata, Musashino (JP); Kota Sato, Musashino (JP); Yasuko Ogihara, Musashino (JP)

(73) Assignee: Yokogawa Electric Corporation, Tokyo (JP)

( * ) Notice: Subject to any disclaimer, the term of this patent is extended or adjusted under 35 U.S.C. 154(b) by 291 days.

(21) Appl. No.: 18/186,900

(22) Filed: Mar. 20, 2023

(65) Prior Publication Data

US 2023/0304930 A1 Sep. 28, 2023

(30) Foreign Application Priority Data

Mar. 28, 2022 (JP) ................................ 2022-052047

(51) Int. Cl.
  *G01N 21/59* (2006.01)
  *G01N 21/47* (2006.01)
(52) U.S. Cl.
  CPC ......... *G01N 21/59* (2013.01); *G01N 21/4738* (2013.01)
(58) Field of Classification Search
  None
  See application file for complete search history.

(56) References Cited

U.S. PATENT DOCUMENTS

| | | | | |
|---|---|---|---|---|
| 12,174,168 | B2* | 12/2024 | Narula | G01N 21/82 |
| 2009/0231581 | A1* | 9/2009 | Han | A47L 15/4297 |
| | | | | 356/341 |
| 2013/0077097 | A1* | 3/2013 | Engstrand | G01N 21/41 |
| | | | | 356/437 |
| 2013/0278921 | A1* | 10/2013 | Choi | G01N 21/534 |
| | | | | 356/51 |
| 2014/0016117 | A1* | 1/2014 | Chaiken | A61B 5/1455 |
| | | | | 356/51 |
| 2020/0056990 | A1* | 2/2020 | Tateishi | G01F 1/00 |

FOREIGN PATENT DOCUMENTS

| | | | | |
|---|---|---|---|---|
| CN | 109313114 A | * | 2/2019 | G01F 1/704 |
| CN | 109635249 A | * | 4/2019 | G01N 21/314 |
| CN | 113030023 A | * | 6/2021 | B08B 13/00 |
| DE | 102011075121 A1 | * | 11/2012 | F24H 1/10 |
| DE | 102021110821 A1 | * | 11/2021 | B60K 6/24 |
| FR | 3147861 A1 | * | 10/2024 | C02F 1/008 |
| JP | 2004177122 A | | 6/2004 | |

(Continued)

*Primary Examiner* — Michael P Stafira

(57) ABSTRACT

A control apparatus includes a controller configured to measure turbidity based on received light waveforms of light received through a liquid to be measured, acquire waveform data indicating a received light waveform of light received when the measured turbidity rises above a threshold, execute, using the acquired waveform data as input, an identification process for identifying a type of substance mixed in the liquid to be measured to thereby acquire an identification result of the type of substance, and determine the type of substance with reference to the acquired identification result.

10 Claims, 8 Drawing Sheets

(56) References Cited

FOREIGN PATENT DOCUMENTS

| | | | |
|---|---|---|---|
| JP | 2006-329629 A | | 12/2006 |
| JP | 2016003974 A | | 1/2016 |
| JP | 2016191679 A | | 11/2016 |
| JP | 2018059728 A | * | 4/2018 |
| KR | 100795373 B1 | * | 1/2008 |
| KR | 100903133 B1 | * | 6/2009 |
| KR | 20090090616 A | * | 8/2009 |
| WO | 2013008520 A1 | | 1/2013 |
| WO | WO-2016085472 A1 | * | 6/2016 ............. G01N 15/06 |
| WO | 2020262615 A1 | | 12/2020 |
| WO | WO-2021014695 A1 | * | 1/2021 ........... G01N 27/333 |

* cited by examiner

CONTROL APPARATUS, TURBIDIMETER, DETERMINATION METHOD, AND LEARNING METHOD

CROSS-REFERENCE TO RELATED APPLICATION

The present application claims priority to Japanese Patent Application No. 2022-052047 filed on Mar. 28, 2022, the entire contents of which are incorporated herein by reference.

TECHNICAL FIELD

The present disclosure relates to a control apparatus, a turbidimeter, a determination method, and a learning method.

BACKGROUND

Turbidimeters that optically measure the turbidity of a liquid to be measured, such as industrial water, are known. Turbidity is an indicator representing the degree to which water is turbid. The measurement methods used in turbidimeters can, for example, be classified into a transmitted light method, scattered light method, transmitted-scattered light method, surface scattered light method, integrating sphere method, and the like. In the transmitted-scattered light method, light incident from a light source onto the liquid to be measured is separated into transmitted light and scattered light and is detected. In the surface scattered light method, light is shone on the surface of the liquid to be measured, and the scattered light from the surface is measured. In the integrating sphere method, the ratio between the intensities of transmitted light (or total incident light) and scattered light is calculated.

Patent literature (PTL) 1 describes technology for turbidimeters using the transmitted-scattered light method to optically calculate turbidity based on the amount of transmitted light and scattered light.

CITATION LIST

Patent Literature

PTL 1: JP 2006-329629 A

SUMMARY

A control apparatus according to several embodiments includes a controller configured to measure turbidity based on received light waveforms of light received through a liquid to be measured, acquire waveform data indicating a received light waveform of light received when the measured turbidity rises above a threshold, execute, using the acquired waveform data as input, an identification process for identifying a type of substance mixed in the liquid to be measured to thereby acquire an identification result of the type of substance, and determine the type of substance with reference to the acquired identification result. In such a control apparatus, the type of substance mixed in the liquid to be measured can be determined from the received light waveform. It thus becomes easier to identify the cause of the change in turbidity without visual observation of the state of the liquid to be measured.

A determination method according to several embodiments includes measuring turbidity based on received light waveforms of light received through a liquid to be measured; acquiring waveform data indicating a received light waveform of light received when the measured turbidity rises above a threshold; and executing, using the acquired waveform data as input, an identification process for identifying a type of substance mixed in the liquid to be measured to thereby determine the type of substance. In such a determination method, the type of substance mixed in the liquid to be measured can be determined from the received light waveform. It thus becomes easier to identify the cause of the change in turbidity without visual observation of state of the liquid to be measured.

A learning method according to several embodiments includes acquiring, with use of multiple types of substances, waveform data indicating a corresponding received light waveform of light received through a liquid in which each type of substance is mixed; associating, for each type of substance, the acquired waveform data with type data indicating the each type of substance to create training data; and generating, by performing machine learning using the created training data, a trained model that takes input data indicating a received light waveform as input and outputs data indicating a type of substance mixed in a liquid through which light corresponding to the received light waveform indicated by the input data is transmitted. In such a learning method, the received light waveform and the type of substance are learned in association. By use of a model obtained by such a learning method, the type of substance can be accurately identified from the received light waveform.

DETAILED DESCRIPTION

Figure 1:
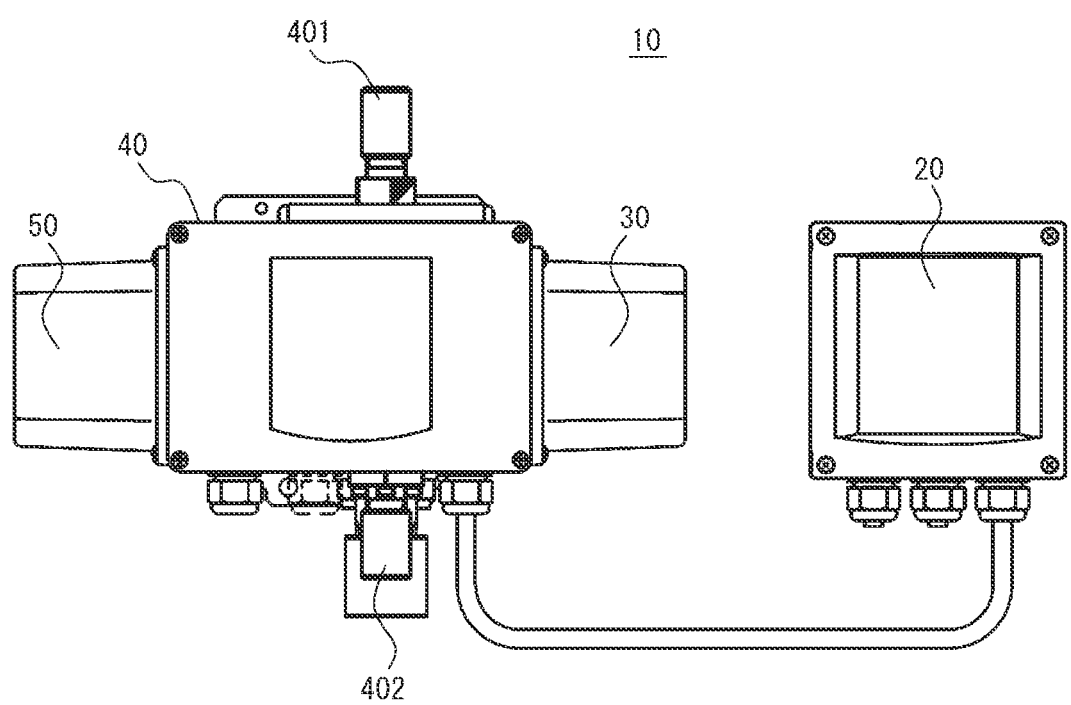
FIG. 1 is a diagram illustrating the appearance of a turbidimeter as an aspect of the present disclosure.

To identify the cause of a change in turbidity with the technology described in PTL 1, it is necessary, for example, for a facility manager or other user to visually observe the state of a liquid to be measured in order.

It would be helpful to facilitate identification of the cause of the change in turbidity without visual observation of the state of the liquid to be measured.

A control apparatus according to several embodiments includes a controller configured to measure turbidity based on received light waveforms of light received through a liquid to be measured, acquire waveform data indicating a received light waveform of light received when the measured turbidity rises above a threshold, execute, using the acquired waveform data as input, an identification process for identifying a type of substance mixed in the liquid to be measured to thereby acquire an identification result of the type of substance, and determine the type of substance with reference to the acquired identification result. In such a control apparatus, the type of substance mixed in the liquid to be measured can be determined from the received light waveform. It thus becomes easier to identify the cause of the change in turbidity without visual observation of the state of the liquid to be measured.

In an embodiment, the controller of the control apparatus is configured to measure the turbidity based on received light waveforms of light that are received and have passed through a low-pass filter and to acquire, as the waveform data, data indicating a received light waveform of light that is received but has not yet passed through the low-pass filter when the turbidity rises above the threshold. According to this embodiment, the measurement of turbidity is performed based on the received light waveform of light with a restricted frequency. This suppresses the effects of noise and the like and improves the accuracy of the measurement results. On the other hand, since the determination of the substance mixed in the liquid to be measured is based on the received light waveform of light with unrestricted frequency, the type of substance can be identified with even higher accuracy. This is because the received light waveform of light with unrestricted frequency is considered to reflect differences in the type of substance more significantly. It thus becomes easier to identify the cause of the change in turbidity more accurately without visual observation of the state of the liquid to be measured.

In an embodiment, as the identification process, the controller of the control apparatus is configured to execute a process, upon receipt of input data indicating a received light waveform, identifying a type of substance corresponding to a waveform pattern of the received light waveform indicated by the input data with reference to a database that defines correspondence relationships between a plurality of waveform patterns and a type of substance mixed in a liquid through which light corresponding to each of the waveform patterns is transmitted, and as the identification result, the controller is configured to acquire data indicating the type of substance identified with reference to the database. According to this embodiment, the identification process can be accelerated, since the type of substance is identified with reference to a database.

In an embodiment, as the identification process, the controller of the control apparatus is configured to execute a process using a trained model that takes input data indicating a received light waveform as input and outputs data indicating a type of substance mixed in a liquid through which light corresponding to the received light waveform indicated by the input data is transmitted, and as the identification result, the controller is configured to acquire the data outputted by the trained model. According to this embodiment, the identification accuracy can be improved by learning, since a trained model is used to identify the type of substance.

In an embodiment, the controller of the control apparatus is configured to notify a user of a determination result for the type of substance. According to this embodiment, the user can recognize the cause of the change in turbidity, which makes it easier to take measures against recurrence and facilitates prevention of recurrence of the abnormality.

In an embodiment, the controller of the control apparatus is configured to notify the user of the determination result by displaying the determination result on a display. According to this embodiment, the user can visually recognize the cause of the change in turbidity.

In an embodiment, the controller of the control apparatus is configured to, upon determining that the type of substance is an air bubble with reference to the identification result, notify the user that the type of substance is an air bubble. Since air bubbles are a cause of errors in turbidity measurements, it is desirable to physically remove air bubbles with a defoaming apparatus such as a defoaming tank during turbidity measurement. According to this embodiment, the user can be notified when air bubbles cannot be removed completely or when air bubbles that have not been removed to begin with are mixed in the liquid to be measured. The user can thus be made aware that the measurement value of the turbidimeter contains an error. Furthermore, the user can correct the turbidity error and adjust the measurement results.

In an embodiment, the controller of the control apparatus is configured to acquire imaging data of the liquid to be measured and to notify the user of the acquired imaging data together with the determination result. According to this embodiment, the user can visually confirm the type of substance determined from the waveform, and the analysis accuracy can be improved by linking the imaging data and the determination result.

In an embodiment, the received light waveform indicated by the waveform data includes a waveform of transmitted light transmitted through the liquid to be measured and a waveform of scattered light reflected and scattered by the substance. According to this embodiment, the identification process for identifying the type of substance is performed based on the combination of the waveform of transmitted light and the waveform of scattered light. It thus becomes easier to identify the cause of the change in turbidity more accurately without visual observation of the state of the liquid to be measured.

A turbidimeter according to several embodiments includes the above-described control apparatus and a light receiving apparatus configured to receive light through the liquid to be measured and to input data indicating a received light waveform of the received light to the control apparatus. In such a turbidimeter, the type of substance mixed in the liquid to be measured can be determined from the received light waveform. It thus becomes easier to identify the cause of the change in turbidity without visual observation of the state of the liquid to be measured.

A determination method according to several embodiments includes measuring turbidity based on received light waveforms of light received through a liquid to be measured; acquiring waveform data indicating a received light waveform of light received when the measured turbidity rises above a threshold; and executing, using the acquired waveform data as input, an identification process for identifying a type of substance mixed in the liquid to be measured to thereby determine the type of substance. In such a determination method, the type of substance mixed in the liquid to be measured can be determined from the received light waveform. It thus becomes easier to identify the cause of the change in turbidity without visual observation of the state of the liquid to be measured.

A learning method according to several embodiments includes acquiring, with use of multiple types of substances, waveform data indicating a corresponding received light waveform of light received through a liquid in which each type of substance is mixed; associating, for each type of substance, the acquired waveform data with type data indicating the each type of substance to create training data; and generating, by performing machine learning using the created training data, a trained model that takes input data indicating a received light waveform as input and outputs data indicating a type of substance mixed in a liquid through which light corresponding to the received light waveform indicated by the input data is transmitted. In such a learning method, the received light waveform and the type of substance are learned in association. By use of a model obtained by such a learning method, the type of substance can be accurately identified from the received light waveform.

According to the present disclosure, it becomes easier to identify the cause of the change in turbidity without visual observation of the state of the liquid to be measured.

The present disclosure is now described with reference to the drawings.

Identical or equivalent portions in the drawings are labeled with the same reference signs. In the explanation of the present disclosure, a description of identical or equivalent portions is omitted or simplified as appropriate.

Figure 2:
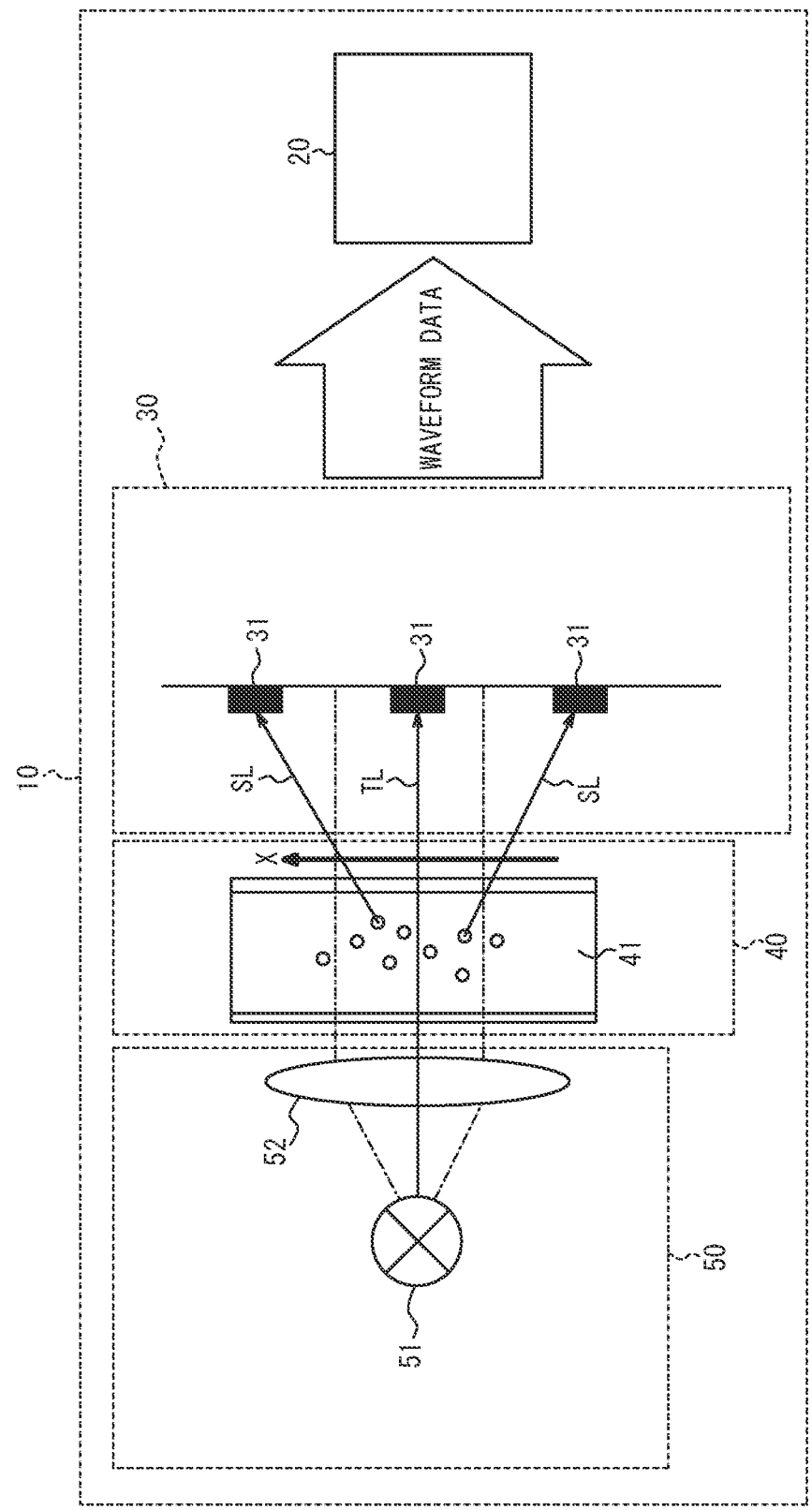
FIG. 2 is a diagram illustrating a configuration example of a turbidimeter as an aspect of the present disclosure.

With reference to FIGS. 1 and 2, a configuration of a turbidimeter 10 as an aspect of the present disclosure is described.

The turbidimeter 10 as an aspect of the present disclosure is an apparatus configured to measure turbidity based on received light waveforms of light received through a liquid to be measured 41. The turbidimeter 10 is described below as a turbidimeter using the transmitted-scattered light method.

The turbidimeter 10 includes a main body 40, a control apparatus 20, a light receiving apparatus 30, and a light source apparatus 50. The main body 40 has a measured liquid inlet 402 through which the liquid to be measured 41 flows into the main body 40 and a measured liquid outlet 401 through which the liquid to be measured 41 exits after flowing in.

The light source apparatus 50 includes a light source 51 and a lens 52. The light source 51 is, for example, a light bulb or LED. "LED" is an abbreviation of light emitting diode.

The light receiving apparatus 30 includes one or more light receiving elements 31. Three light receiving elements 31 are illustrated in FIG. 2, but the number of light receiving elements 31 is not limited to three and may be any appropriate number. The light receiving element 31 converts received light to a current signal. For example, the light receiving element 31 is a photodiode.

The control apparatus 20 is a computer. The control apparatus 20 is, for example, a dedicated device, a general purpose device such as a mobile device or PC, or a server device belonging to a cloud computing system or other computing system. "PC" is an abbreviation of personal computer. Mobile devices include mobile phones, smartphones, or tablets.

The control apparatus 20 is mounted inside the turbidimeter 10. Alternatively, the control apparatus 20 may be installed outside of the turbidimeter 10 and communicate with the turbidimeter 10 in a wireless or wired manner. Communication is via a network such as a LAN or the Internet. "LAN" is an abbreviation of local area network. For example, communication may be performed using a communication interface compatible with mobile communication standards such as LTE, 4G, or 5G standards, wireless LAN communication standards such as IEEE 802.11, or wired LAN communication standards such as Ethernet® (Ethernet is a registered trademark in Japan, other countries, or both). "LTE" is an abbreviation of Long Term Evolution. "4G" is an abbreviation of 4th generation. "5G" is an abbreviation of 5th generation. "IEEE" is an abbreviation of Institute of Electrical and Electronics Engineers.

The light receiving apparatus 30 can communicate with the control apparatus 20 directly or via a network such as a LAN or the Internet. For example, the light receiving apparatus 30 may communicate with the control apparatus 20 using a communication interface compatible with mobile communication standards such as LTE, 4G, or 5G standards, wireless LAN communication standards such as IEEE 802.11, or wired LAN communication standards such as Ethernet®.

With reference to FIG. 2, the operating principle of the turbidimeter 10 is now described.

In the turbidimeter 10, the liquid to be measured 41 passes through the interior of the main body 40 in the direction of the arrow X. Light irradiated towards the liquid to be measured 41 by the light source 51 of the light source apparatus 50 is received by each of the light receiving elements 31 of the light receiving apparatus 30 via the lens 52 and the liquid to be measured 41. Here, the light incident on the liquid to be measured 41 is received by the light receiving elements 31 as transmitted light TL linearly transmitted through the liquid to be measured 41 and scattered light SL scattered by a substance mixed in the liquid to be measured 41. The light received by the light receiving elements 31 is outputted to the control apparatus 20 via the current-to-voltage conversion amplifier circuit described below. The control apparatus 20 measures the turbidity of the liquid to be measured 41 based on the received light waveform, which is the waveform of the outputted voltage value.

Figure 3:
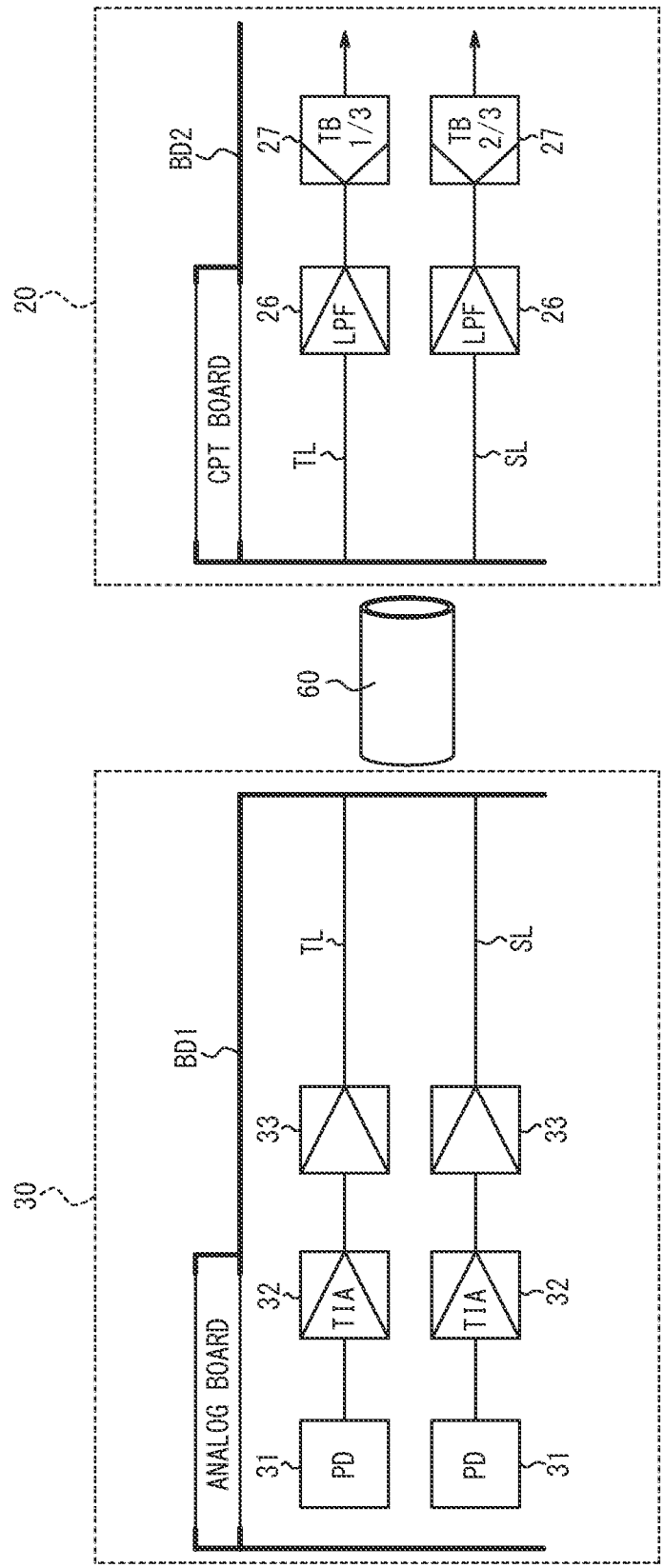
FIG. 3 is a diagram illustrating a configuration example of a current-to-voltage conversion amplifier circuit in a turbidimeter as an aspect of the present disclosure.

With reference to FIG. 3, an example configuration of the current-to-voltage conversion amplifier circuit is described.

The current-to-voltage conversion amplifier circuit illustrated in FIG. 3 is configured as a circuit from a front-end amplifier of the light receiving apparatus 30 to the CPU of the control apparatus 20. "CPU" is an abbreviation of Central Processing Unit.

The current-to-voltage conversion amplifier circuit is mounted across an analog board BD1 and a CPT board BD2. "CPT" is an abbreviation of Capacitive Power Transfer. The analog board BD1 and the CPT board BD2 are connected by a coaxial cable 60. In FIG. 3, the signal path of transmitted light TL is indicated in the upper tier, and the signal path of scattered light SL is indicated in the lower tier. One of the two signal paths of scattered light SL is omitted. Both the transmitted light TL and the scattered light SL are processed in the same way. The light receiving elements 31, optical receivers 32, and processing circuits 33 are respectively provided along the signal path of transmitted light TL and the signal path of scattered light SL on the analog board BD1. The optical receiver 32 is, for example, a TIA. "TIA" is an abbreviation of Transimpedance Amplifier. The processing circuit 33 is, for example, a line driver amplifier. Data is transferred to the optical receiver 32 by a serial bus. The serial bus is a two-wire serial bus, such as the I2C bus. "I2C" is an abbreviation of Inter-Integrated Circuit. Low-pass filters 26 and AD converters 27 are respectively provided along the signal path of transmitted light TL and the signal path of scattered light SL on the CPT board BD2. "AD" is an abbreviation of Analog to Digital. In FIG. 3, the analog board BD1 is provided in the light receiving apparatus 30, and the CPT board BD2 is provided in the control apparatus 20, but the present disclosure is not limited to this configuration. Any appropriate configuration may be adopted as long as the current signal from the light receiving element 31 can be converted into a voltage signal and further into a digital signal and then outputted to the CPU, as described below. Three each of the light receiving elements 31, the optical receivers 32, the processing circuits 33, the low-pass filters 26, and the AD converters 27 are provided, and two each are illustrated in FIG. 3, but the number of each element is not limited to this example and can be selected freely according to the number and type of received light signals.

In FIG. 3, light passing through the liquid to be measured 41 is received by the light receiving element 31 and converted into a current signal having a current value corresponding to the intensity of the light. This current signal is converted by the optical receiver 32 in the subsequent stage into a voltage signal with a voltage value corresponding to the light intensity. This voltage signal is amplified by the processing circuit 33 and passes through the coaxial cable 60, and after high-frequency components are attenuated by the low-pass filter 26, the voltage signal is subjected to AD conversion by the AD converter 27 in the subsequent stage and is outputted to the CPU.

When measuring turbidity, it is common practice to lower the cutoff frequency of the low-pass filter 26 to prevent signals other than DC components from entering the AD converter 27. This is to prevent aliasing, for example, caused in particular by AC components and the like among the components included in the signal before AD conversion, thereby suppressing errors in the results of turbidity measurement to improve the accuracy of measurement.

Several embodiments are described below as specific examples of the present disclosure.

First Embodiment

Figure 4:
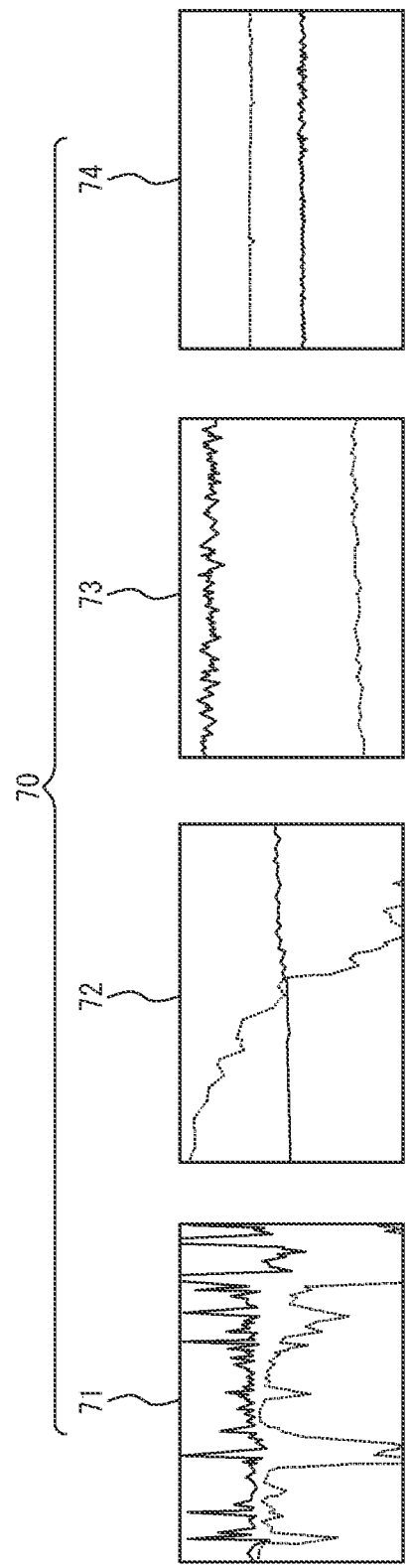
FIG. 4 is a diagram illustrating an example of waveform data according to an embodiment of the present disclosure.

An overview of the present embodiment is provided with reference to FIG. 4.

The control apparatus 20 measures turbidity based on a received light waveform of light received through a liquid to be measured 41. The control apparatus 20 acquires waveform data 70 indicating a received light waveform of light received when the measured turbidity rises above a threshold. The control apparatus 20 executes, using the acquired waveform data 70 as input, an identification process for identifying a type of substance mixed in the liquid to be measured to thereby determine the type of substance. The control apparatus 20 notifies a user of a determination result for the type of substance.

In a case in which different types of substances are optically measured, the resulting received light waveform is also considered to differ due to differences in parameters such as the size, transparency, concentration, or mobility of the measured object. Focusing on this point, we discovered that it is possible to determine the type of substance mixed in the liquid to be measured 41 based on the received light waveform that is obtained when the turbidity increases.

In the present embodiment, the waveform data 70 is raw data indicating the waveforms of transmitted light and scattered light observed by an oscilloscope or other measuring instrument. When waveforms are observed, the sampling rate may be varied as necessary to adjust the resolution, response, or storage medium usage. Alternatively, sound waves may be generated in response to the waveforms. Specifically, the type or volume of sound generated may be varied according to the type or magnitude of the waveform. As an example, the tone may be differentiated between transmitted light and scattered light.

FIG. 4 illustrates a first waveform 71, a second waveform 72, a third waveform 73, and a fourth waveform 74 as examples of the waveform data 70. In each waveform, the solid line indicates the waveform of transmitted light, the dashed line indicates the waveform of scattered light, the horizontal axis represents time, and the vertical axis represents the voltage value. The first waveform 71 is an example of the waveform observed when dried bonito flakes were placed into the liquid to be measured 41, assuming that fallen leaves were mixed in the measurement path. The second waveform 72 is an example of the waveform observed when kaolin was placed into the liquid to be measured 41, assuming that sludge was mixed in the measurement path. "Kaolin" is a common name for clay minerals composed mainly of kaolinite ($Al_2O_3 \cdot 2SiO_2 \cdot 2H_2O$). The third waveform 73 is an example of the waveform observed when soil collected from the ground was placed into the liquid to be measured 41, assuming that dirt was mixed in the measurement path. The fourth waveform 74 is an example of the waveform observed when carbonated water was placed into the liquid to be measured 41, assuming that air bubbles were mixed in the measurement path. It is clear from the first waveform 71, the second waveform 72, the third waveform 73, and the fourth waveform 74 that the resulting received light waveforms differ depending on the type of substance mixed in the liquid to be measured 41.

According to the present embodiment, the type of substance is determined based on the waveform data 70. This enables detection of air bubbles or foreign substances, mixed in a liquid to be measured, which until now could not be detected without visual observation. In the past, it was not possible to determine whether an increase in turbidity was caused by air bubbles or by foreign matter such as sludge. Therefore, in some cases, users such as facility managers had to investigate the cause of the increase in turbidity each time an abnormality occurred. In a case in which the turbidimeter is installed in a remote location, however, the abnormal phenomenon may have disappeared by the time the user arrives at the site. In such cases, identification of the cause becomes impossible. The inability to identify the cause makes it difficult to take measures to prevent recurrence, and as a result, the abnormality might recur. According to the present embodiment, it becomes easier to identify the cause of the change in turbidity without visual observation of the state of the liquid to be measured 41. The burden on the user is thereby reduced. This also makes it easier for the user to take measures to prevent recurrence of abnormal phenomena.

Figure 5:
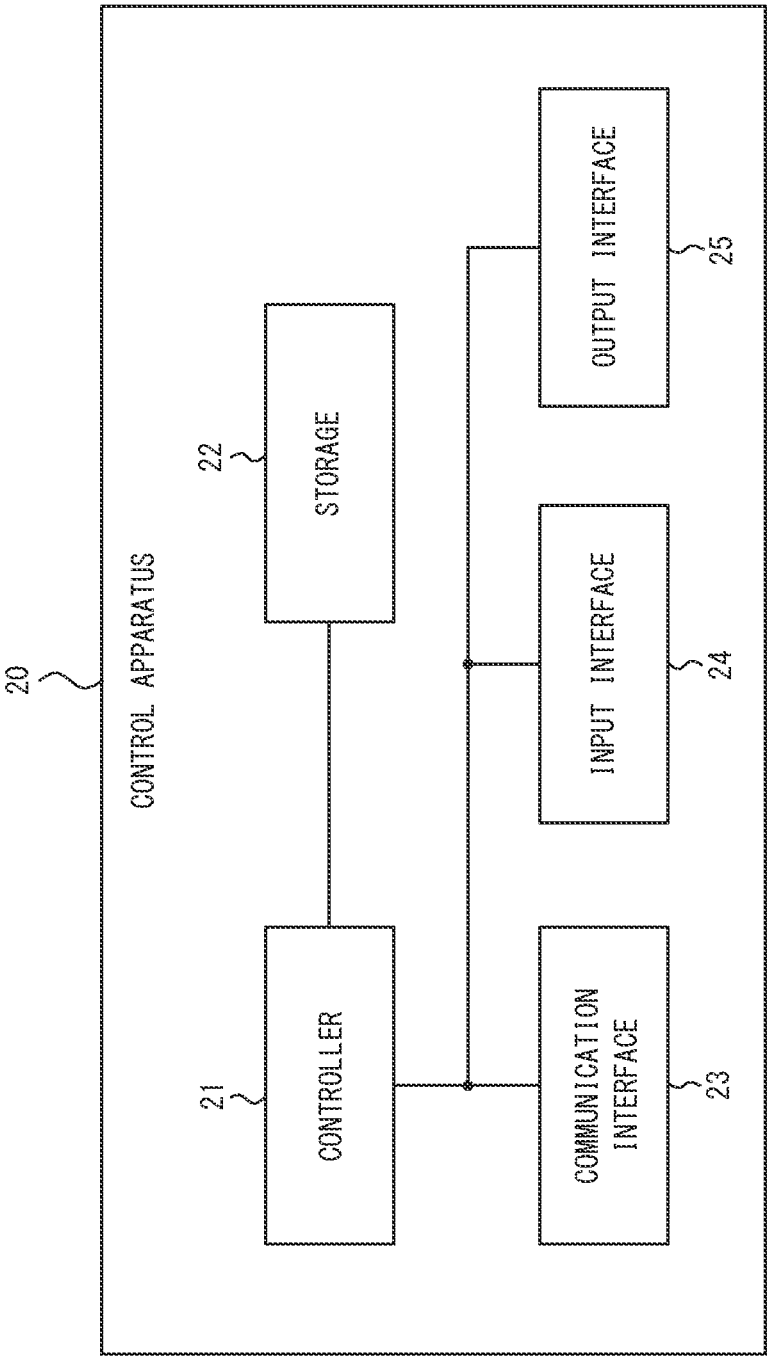
FIG. 5 is a block diagram illustrating a configuration of a control apparatus according to an embodiment of the present disclosure.

With reference to FIG. 5, a configuration of the control apparatus 20 according to the present embodiment is described.

The control apparatus 20 includes a controller 21, a storage 22, a communication interface 23, an input interface 24, and an output interface 25.

The controller 21 includes at least one processor, at least one programmable circuit, at least one dedicated circuit, or any combination thereof. The processor may be a general purpose processor, such as a CPU or GPU, or a dedicated processor specialized for particular processing. "GPU" is an abbreviation of graphics processing unit. The programmable circuit is, for example, an FPGA. "FPGA" is an abbreviation of field-programmable gate array. The dedicated circuit is, for example, an ASIC. "ASIC" is an abbreviation of application specific integrated circuit. The controller 21 executes processing related to operation of the control apparatus 20 while controlling each component of the control apparatus 20.

The storage 22 includes at least one semiconductor memory, at least one magnetic memory, at least one optical memory, or any combination thereof. The semiconductor memory is, for example, RAM, ROM, or SSD. "RAM" is an abbreviation of random access memory. "ROM" is an abbreviation of read only memory. "SSD" is an abbreviation of solid state drive. The RAM is, for example, SRAM or DRAM. "SRAM" is an abbreviation of static random access memory. "DRAM" is an abbreviation of dynamic random access memory. The ROM is, for example, EEPROM. "EEPROM" is an abbreviation of electrically erasable programmable read only memory. The magnetic memory is, for example, HDD. "HDD" is an abbreviation of hard disk drive. The storage 22 functions as, for example, a main memory, an auxiliary memory, or a cache memory. The storage 22 stores data to be used for operation of the control apparatus 20 and data resulting from operation of the control apparatus 20. In the present embodiment, the waveform data 70 is stored in the storage 22. As a variation of the present embodiment, the waveform data 70 may be stored in an external system.

The communication interface 23 includes at least one interface for communication. The interface for communication is, for example, a LAN interface, an interface corresponding to a mobile communication standard such as LTE, the 4G standard, or the 5G standard, a wireless LAN communication standard such as IEEE 802.11, or a wired LAN communication standard such as Ethernet®. The communication interface 23 receives data for use in operation of the control apparatus 20 and transmits data resulting from operation of the control apparatus 20.

The input interface 24 includes at least one interface for input. The interface for input is, for example, a physical key, a capacitive key, a pointing device, a touchscreen integrated with a display, a camera, or a microphone. The input interface 24 receives an operation for inputting data used in operation of the control apparatus 20. Instead of being provided in the control apparatus 20, the input interface 24 may be connected to the control apparatus 20 as an external input device. As the interface for connection, an interface compliant with a standard such as USB, HDMI® (HDMI is a registered trademark in Japan, other countries, or both), or Bluetooth® (Bluetooth is a registered trademark in Japan, other countries, or both) can be used. "USB" is an abbreviation of Universal Serial Bus. "HDMI®" is an abbreviation of High-Definition Multimedia Interface.

The output interface 25 includes at least one interface for output. The interface for output is, for example, a display or speaker. The display is, for example, an LCD or an organic EL display. "LCD" is an abbreviation of liquid crystal display. "EL" is an abbreviation of electro luminescence. The output interface 25 outputs data resulting from operation of the control apparatus 20. Instead of being provided in the control apparatus 20, the output interface 25 may be connected to the control apparatus 20 as an external output device. As the interface for connection, an interface compliant with a standard such as USB, HDMI®, or Bluetooth® can be used. An interface that supports the ISA100 industrial wireless standard or LoRaWAN® (LoRaWAN is a registered trademark in Japan, other countries, or both) may be used as the connection interface. "ISA" is an abbreviation of International Society of Automation. "LoRaWAN" is an abbreviation of Long Range Wide Area Network.

The functions of the control apparatus 20 are implemented by a processor as the controller 21 executing a program according to the present embodiment. In other words, the functions of the control apparatus 20 are implemented by software. The program causes a computer to function as the control apparatus 20 by causing the computer to execute the operations of the control apparatus 20. In other words, the computer functions as the control apparatus 20 by executing the operations of the control apparatus 20 according to the program.

The program can be stored on a non-transitory computer readable medium. The non-transitory computer readable medium is, for example, a flash memory, a magnetic recording device, an optical disk, a magneto-optical recording medium, or ROM. The program is, for example, distributed by the sale, transfer, or lending of a portable recording medium such as an SD card, DVD, or CD-ROM on which the program is stored. "SD" is an abbreviation of Secure Digital. "DVD" is an abbreviation of digital versatile disc. "CD-ROM" is an abbreviation of compact disc read only memory. The program may be distributed by being stored on a storage of a server and transferred from the server to another computer. The program may be provided as a program product.

For example, the computer can temporarily store, in the main memory, the program recorded on the portable medium or transferred from the server. The computer uses a processor to read the program stored in the main memory and executes processing with the processor in accordance with the read program. The computer may read the program directly from the portable medium and execute processing in accordance with the program. Each time the program is transferred from the server to the computer, the computer may sequentially execute processing in accordance with the received program. Processing may be executed by an ASP type of service that implements functions only via execution instructions and result acquisition, without transferring the program from the server to the computer. "ASP" is an abbreviation of application service provider. Examples of the program include an equivalent to the program represented as information provided for processing by an electronic computer. For example, data that is not a direct command for a computer but that has the property of specifying processing by the computer corresponds to the "equivalent to the program".

A portion or all of the functions of the control apparatus 20 may be implemented by a programmable circuit or a dedicated circuit as the controller 21. In other words, a portion or all of the functions of the control apparatus 20 may be implemented by hardware.

Figure 6:
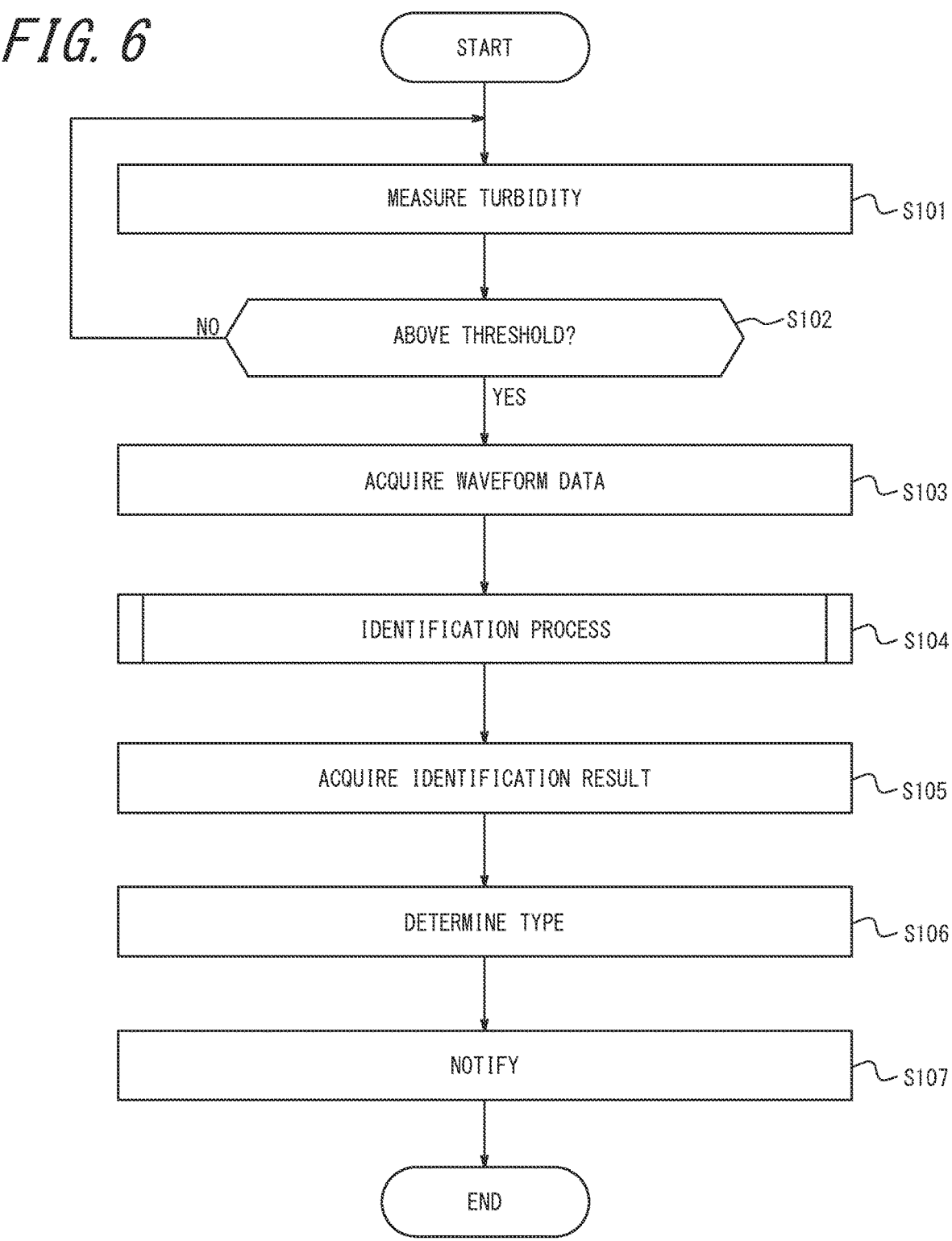
FIG. 6 is a flowchart illustrating operations of a control apparatus according to an embodiment of the present disclosure.

With reference to FIG. 6, operations of the control apparatus 20 according to the present embodiment are described. These operations correspond to a determination method according to the present embodiment.

When the turbidimeter 10 starts up, or an operation to start measurement is performed after startup, the light source 51 of the light source apparatus 50 is driven and irradiates light onto the liquid to be measured 41. The light irradiated by the light source 51 is incident on the liquid to be measured 41. A portion of the light incident on the liquid to be measured 41 is reflected by a substance mixed in the liquid to be measured 41. The light receiving element 31 of the light receiving apparatus 30 receives the light through the liquid to be measured 41. The light receiving element 31 converts the received light to a current signal. The current signal from the light receiving element 31 is converted into a voltage signal by the current-to-voltage conversion amplifier circuit and outputted to the control apparatus 20.

In step S101, the controller 21 of the control apparatus 20 measures turbidity based on the received light waveform of light received through the liquid to be measured 41. Specifically, the controller 21 measures turbidity based on the received light waveform of light that is received and passes through the low-pass filter 26. This is because measuring turbidity based on the received light waveform of light with a restricted frequency suppresses the effects of noise and the like, thereby reducing errors in the measurement results.

In step S102, the controller 21 of the control apparatus 20 determines whether the measured turbidity has increased above a threshold. Specifically, the controller 21 compares the measured turbidity with the threshold. The threshold may be defined freely. For example, the threshold may be a water quality standard value defined by laws such as the Japanese Water Supply Act, a water quality standard value in other countries, or a value conforming to WHO guideline values. "WHO" is an abbreviation of World Health Organization. In a case in which the measured turbidity is greater than the threshold, step S103 is performed. In a case in which the measured turbidity is equal to or less than the threshold, the process returns to step S101.

In step S103, the controller 21 of the control apparatus 20 acquires waveform data 70 indicating the received light waveform of the received light. Specifically, as the waveform data 70, the controller 21 acquires data indicating the received light waveform of light that has not yet passed through the low-pass filter 26. The reason for acquiring data indicating the received light waveform of light that has not yet passed through the low-pass filter 26 is that the received light waveform of light with unrestricted frequency is considered to reflect differences in the type of substance more significantly. Although the band-restricted waveform that has passed through the low-pass filter 26 can also be used, the received light waveform of light that has not yet passed through the low-pass filter 26 is preferably used from the perspectives of sensitivity and response time. The signal of light that has not yet passed through the low-pass filter 26 may, for example, be extracted from before the low-pass filter 26 in the current-to-voltage conversion amplifier circuit illustrated in FIG. 3 or may be extracted by separately providing a circuit in which the low-pass filter 26 is eliminated from the current-to-voltage conversion amplifier circuit. The extracted signal may be sampled and converted to a digital signal using a separate dedicated AD converter, or the extracted signal may be sampled from a conventional AD converter.

In step S104, the controller 21 of the control apparatus 20 executes, using the acquired waveform data 70 as input, an identification process for identifying the type of substance mixed in the liquid to be measured 41. Specifically, the controller 21 of the control apparatus 20 executes a process, upon receipt of input data indicating a received light waveform, identifying the type of substance corresponding to the waveform pattern of the received light waveform indicated by the input data with reference to a database DB that defines correspondence relationships between a plurality of waveform patterns and the type of substance mixed in a liquid through which light corresponding to each of the waveform patterns is transmitted.

In the present embodiment, the waveform pattern can, for example, be defined as a combination of parameters such as the amplitude, period, and DC value of the received light waveform. When data indicating two types of received light waveforms, for transmitted light and scattered light, are inputted as received light waveforms, the controller 21 of the control apparatus 20 may identify the waveform pattern of each received light waveform and treat the combination as one pattern to match in the database DB. As an example, assume that "Pattern A" is identified for the received light waveform of transmitted light and "Pattern B" is identified for the received waveform of scattered light in a certain received light waveform RW. The controller 21 may match a "waveform pattern AB" indicating the combination of "pattern A" and "pattern B" in the database DB as the waveform pattern of the received light waveform RW. In the database DB, the numerical range of each parameter of the corresponding waveform pattern is predefined for each type of substance, such as fallen leaves, sludge, dirt, and air bubbles. Therefore, in a case in which each parameter value of the "waveform pattern AB" is included in the numerical range of the corresponding parameter of the waveform pattern defined in the database DB for a certain type of substance, the type of substance in question is identified as the type of substance corresponding to the "waveform pattern AB".

In the present embodiment, for example, a plurality of types of substances such as dried bonito flakes as a substitute for fallen leaves, kaolin as a substitute for sludge, ground soil as a substitute for dirt, and carbonated water as a substitute for air bubbles are used, and waveform patterns are identified in advance for the received light waveforms of light received through a liquid in which each type of substance is mixed. Then, a table that defines the correspondence between the identified waveform patterns and the types of substances is prepared in advance as a database DB and is used in step S104.

Figure 8:
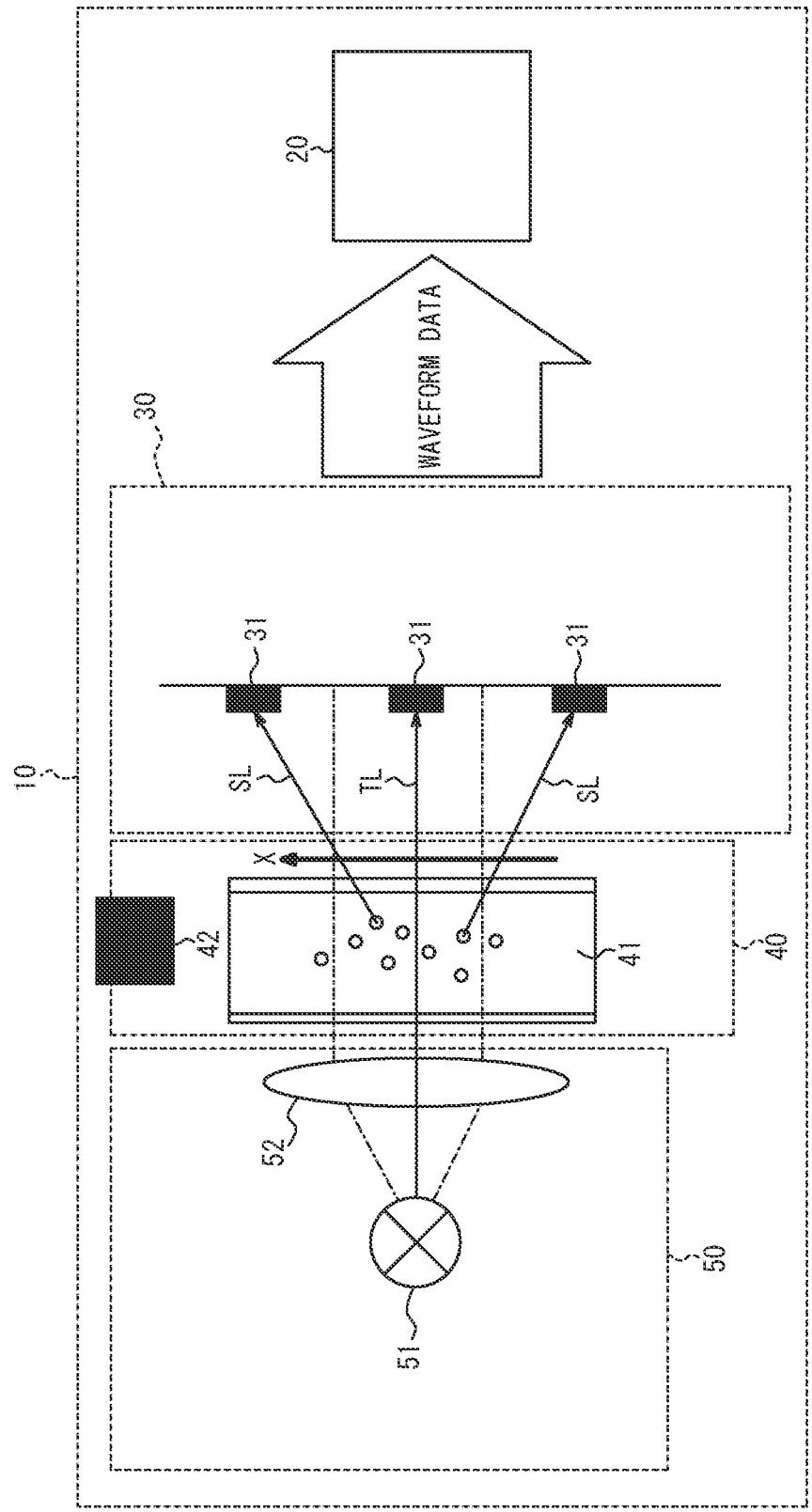
FIG. 8 is a diagram illustrating a variation of the configuration of a turbidimeter as an aspect of the present disclosure.

As a variation of the present embodiment, the controller 21 of the control apparatus 20 may further acquire images of the liquid to be measured 41 captured when each waveform is observed and present the acquired images to the user. The images can be acquired by any imaging device. For example, the controller 21 may acquire image data captured using a network camera 42 attached to the main body 40, as illustrated in FIG. 8, or attached inside the piping, and the image data may be remotely observable via a network. The imaging may be performed under normal water pipe pressure. The image data may be still images or moving images. The image data may be monotone or color. By presenting the user with the imaging data captured when the waveform was observed, the user can also visually confirm the type of substance identified from the waveform and can determine whether the matching result in the database DB is correct.

In the present embodiment, the database DB is established in advance in the storage 22 of the control apparatus 20. Alternatively, the database DB may be established in the cloud. The controller 21 of the control apparatus 20 refers to the database DB to identify the type of substance corresponding to the waveform pattern of the received light waveform that was inputted.

In step S105, the controller 21 of the control apparatus 20 acquires the result of the identification process in step S104 as the identification result. Specifically, the controller 21 acquires data indicating the type of substance identified in step S104 as the identification result.

In step S106, the controller 21 of the control apparatus 20 determines the type of substance mixed in the liquid to be measured 41 with reference to the identification result acquired in step S105. Specifically, the controller 21 determines that a substance of the type indicated by the data acquired in step S105 has been mixed in the liquid to be measured 41.

In step S107, the controller 21 of the control apparatus 20 notifies the user of the result of determining the type of substance in step S106. Specifically, the controller 21 displays the determination result on the display as the output interface 25. The controller 21 may output the determination result by voice via a speaker as the output interface 25. The controller 21 may also provide notification via a network. For example, the notification may be transmitted to a terminal apparatus installed in an administrative office or to a terminal apparatus carried by an administrator who is the user.

In step S106 in the present embodiment, the controller 21 of the control apparatus 20 refers to the identification result, and in a case of determining that the type of substance is an air bubble, the controller 21 notifies the user that the type of substance is an air bubble in step S107. In a case in which the controller 21 of the control apparatus 20 refers to the identification result and determines that the type of substance is something other than air bubbles in step S106, the controller 21 may, in step S107, notify the user of the specific type of substance, such as fallen leaves, sludge, or dirt.

Since air bubbles cause errors in turbidity measurements, it has conventionally been necessary to physically remove air bubbles with a defoaming apparatus such as a defoaming tank when measuring turbidity. According to the present embodiment, the user can be notified when air bubbles are mixed in the liquid to be measured 41, thereby making it easier for the user to recognize that the measured value of the turbidimeter 10 contains an error. Furthermore, the user can correct the turbidity error and adjust the measurement results.

As described above, in the present embodiment, the controller 21 of the control apparatus 20 measures turbidity based on the received light waveform of light received through the liquid to be measured 41. The controller 21 acquires the waveform data 70 indicating the received light waveform of light received when the measured turbidity rises above a threshold. The controller 21 uses the acquired waveform data 70 as input and executes an identification process for identifying the type of substance mixed in the liquid to be measured 41 to determine the type of substance. According to the present embodiment, the cause of the change in turbidity can be identified without visual observation of the state of the liquid to be measured 41.

Second Embodiment

Figure 7:
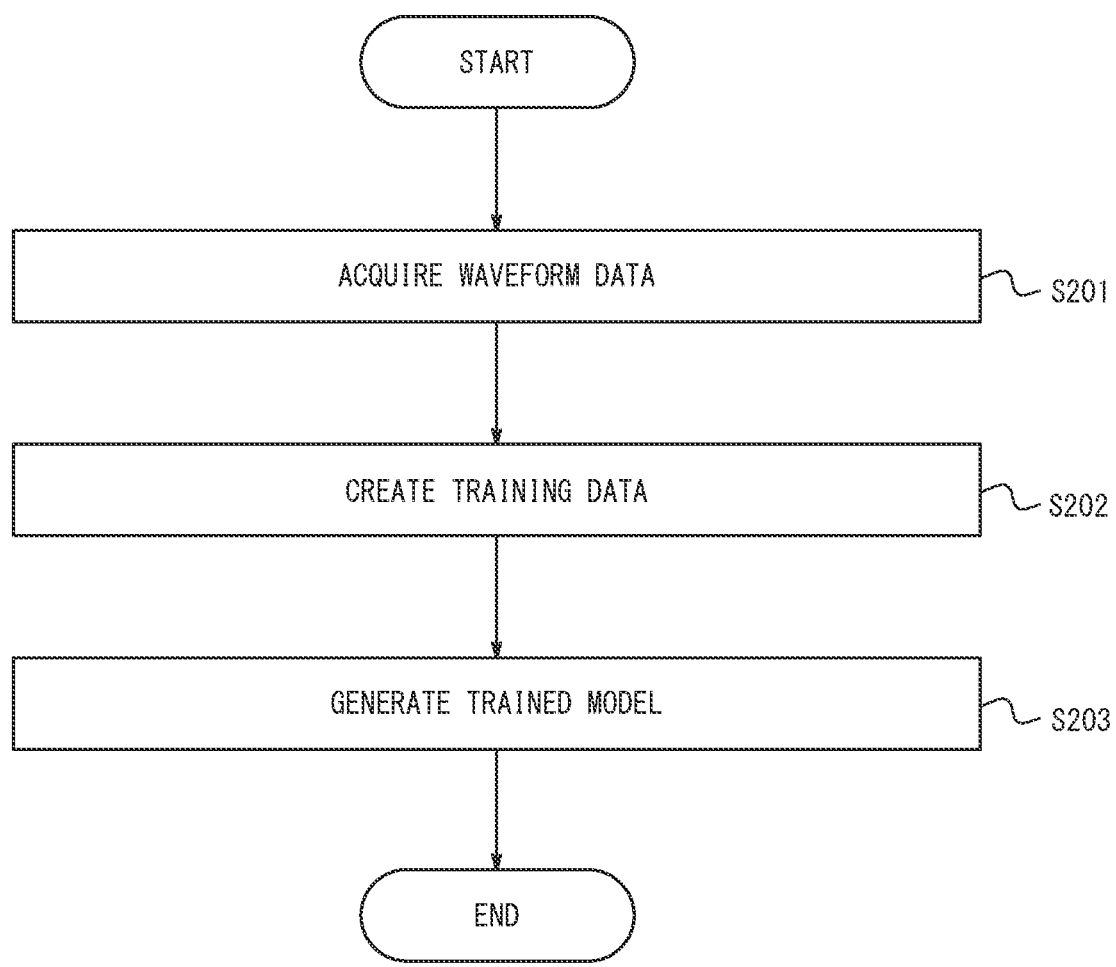
FIG. 7 is a diagram illustrating procedures for generating a trained model according to another embodiment of the present disclosure.

An overview of the present embodiment is provided with reference to FIG. 7. The present embodiment is described below, focusing mainly on the differences from the first embodiment.

In the first embodiment described above, the controller 21 of the control apparatus 20 performs a process using the database DB as the identification process of step S104. In contrast, in the present embodiment, the controller 21 of the control apparatus 20 performs a process using a trained model for identifying the type of substance mixed in the liquid to be measured 41 as the identification process of step S104. Specifically, the controller 21 executes a process using a trained model that takes input data indicating a received light waveform as input and outputs data indicating a type of substance mixed in a liquid through which light corresponding to the received light waveform indicated by the input data is transmitted. The controller 21 inputs the waveform data 70 acquired in step S103 to the trained model for identifying the type of substance mixed in the liquid to be measured 41 so as to acquire the identification result of the type of substance from the trained model.

The trained model may be generated by any learning method. In the present embodiment, however, the following learning method is used.

With reference to FIG. 7, the procedures for generating a trained model are described. These procedures correspond to a learning method according to the present embodiment.

In step S201, the controller 21 of the control apparatus 20 acquires waveform data. In the present embodiment, the waveform data is, with use of multiple types of substances, data indicating a corresponding received light waveform of light received through a liquid in which each type of substance is mixed. The waveform data may include sound data indicating the sound corresponding to the received light waveform.

In step S202, the controller 21 of the control apparatus 20 creates training data. Specifically, the controller 21 creates the training data by associating, for each type of substance, the waveform data acquired in step S201 with type data indicating the type of substance. For example, the controller 21 associates the acquired waveform data with type data indicating the type of substance by associating the waveform data with a label indicating the type of substance.

The procedures for creating training data are now explained in detail, assuming that data indicating the waveforms illustrated in FIG. 4 was acquired in step S201. In the present embodiment, the controller 21 of the control apparatus 20 accepts input from the user, via the input interface 24, of the type of substance that was introduced when each waveform was observed and associates the type data indicating the inputted types with the first waveform 71, the second waveform 72, the third waveform 73, and the fourth waveform 74. Specifically, the controller 21 associates data indicating "fallen leaves" as type data with the first waveform 71. The controller 21 associates data indicating "sludge" as type data with the second waveform 72. The controller 21 associates data indicating "dirt" as type data with the third waveform 73. The controller 21 associates data indicating "air bubbles" as type data with the fourth waveform 74.

As a variation of the present embodiment, instead of having the user input the type of substance, the controller 21 of the control apparatus 20 may acquire images of the liquid to be measured 41 captured when each waveform was observed and automatically recognize the type of substance by analyzing the acquired images using a known method. The analysis of the images can, for example, be performed by AI. "AI" is an abbreviation of artificial intelligence. The images can be acquired by any appropriate imaging device. For example, the controller 21 may acquire image data captured using a network camera 42 attached to the main body 40 or attached inside the piping, and the image data may be remotely observable via a network.

In step S203, a trained model is generated. Specifically, a trained model is created by performance of machine learning using the training data created in step S202, the trained model taking input data indicating a received light waveform as input and outputting data indicating a type of substance mixed in a liquid through which light corresponding to the received light waveform indicated by the input data is transmitted. The machine learning can be performed by known machine learning algorithms, such as neural networks or deep learning.

In the present embodiment, the trained model outputs a label, as the identification result, corresponding to the class to which the type of substance belongs. Specifically, the outputted label corresponds to the class, among the four classes of "fallen leaves", "sludge", "dirt", and "air bubbles", to which the type of substance indicated by the type data belongs.

In the present embodiment, the controller 21 of the control apparatus 20 acquires data indicating the type of substance as the identification result by performing the identification process in step S104 using the above-described trained model.

As described above, in the present embodiment, as the identification process, the controller 21 of the control apparatus 20 executes a process using a trained model that takes input data indicating a received light waveform as input and outputs data indicating a type of substance mixed in a liquid through which light corresponding to the received light waveform indicated by the input data is transmitted. As the identification result, the controller 21 acquires the data outputted by the trained model.

According to the present embodiment, the controller 21 of the control apparatus 20 identifies the type of substance using a trained model. The identification accuracy can be improved by learning, since a trained model is used to identify the type of substance.

The present disclosure is not limited to the above embodiments. For example, a plurality of blocks described in the block diagrams may be integrated, or a block may be divided. Instead of executing a plurality of steps described in the flowcharts in chronological order in accordance with the description, the plurality of steps may be executed in parallel or in a different order according to the processing capability of the apparatus that executes each step, or as required. Other modifications can be made without departing from the spirit of the present disclosure.

For example, the turbidimeter 10 using the transmitted-scattered light method as an aspect of the present disclosure has been described as an example, but the above embodiment is not limited to the turbidimeter 10, as long as the apparatus optically measures the state of the liquid to be measured 41, and may be applied to a turbidimeter that uses any appropriate method such as the transmitted light method, scattered light method (for example, a right angle scattering type), transmitted-scattered light method, surface scattered light method, or integrating sphere method.

For example, the turbidimeter as an aspect of the present disclosure has been described as an example, but the above embodiment is not limited to the turbidimeter 10, as long as the apparatus optically measures the state of the liquid to be measured 41, and may be applied to any appropriate apparatus such as a residual chlorine meter, pH meter, differential pressure/pressure meter, flow meter, or colorimeter.

The invention claimed is:

1. A turbidimeter comprising:
a control apparatus comprising a processor; and
a light receiving apparatus configured to receive light through a liquid to be measured and to input data indicating a received light waveform of the received light to the control apparatus,
wherein the processor is configured to:
measure turbidity of the liquid to be measured based on received light waveforms of light received through the liquid to be measured;
acquire waveform data indicating a received light waveform of light received when it is determined that the measured turbidity rises above a threshold;
execute, using the acquired waveform data as input, an identification process of identifying a type of substance mixed in the liquid to be measured to thereby acquire an identification result of the type of substance; and
determine the type of substance with reference to the acquired identification result,
wherein the processor is further configured to:
as the identification process, execute a process of, upon receipt of input data indicating a received light waveform, identifying a type of substance corresponding to a waveform pattern of the received light waveform indicated by the input data with reference to a database that defines correspondence relationships between a plurality of waveform patterns and a type of substance mixed in a liquid through which light corresponding to each of the waveform patterns is transmitted; and
as the identification result, acquire data indicating the type of substance identified with reference to the database.

2. The control apparatus according to claim 1, wherein the processor is configured to measure the turbidity based on received light waveforms of light that are received and have passed through a low-pass filter and to acquire, as the waveform data, data indicating a received light waveform of light that is received but has not yet passed through the low-pass filter when the turbidity rises above the threshold.

3. The control apparatus according to claim 1, wherein as the identification process, the processor is configured to execute a process using a trained model that takes input data indicating a received light waveform as input and outputs data indicating a type of substance mixed in a liquid through which light corresponding to the received light waveform indicated by the input data is transmitted, and
as the identification result, the processor is configured to acquire the data outputted by the trained model.

4. The control apparatus according to claim 1, wherein the processor is configured to notify a user of a determination result for the type of substance.

5. The control apparatus according to claim 4, wherein the processor is configured to notify the user of the determination result by displaying the determination result on a display.

6. The control apparatus according to claim 4, wherein the processor is configured to, upon determining that the type of substance is an air bubble with reference to the identification result, notify the user that the type of substance is an air bubble.

7. The control apparatus according to claim 4, wherein the processor is configured to acquire imaging data of the liquid to be measured and to notify the user of the acquired imaging data together with the determination result.

8. The control apparatus according to claim 1, wherein the received light waveform indicated by the waveform data includes a waveform of transmitted light transmitted through the liquid to be measured and a waveform of scattered light reflected and scattered by the substance.

9. A method for a turbidimeter, comprising:
receiving, by a light receiving apparatus included in the turbidimeter, light through a liquid to be measured;
inputting, by the light receiving apparatus, data indicating a received light waveform of the received light to a control apparatus included in the turbidimeter, the control apparatus comprising a processor;
measuring, by the processor, turbidity of the liquid to be measured based on received light waveforms of light received through the liquid to be measured;
acquiring, by the processor, waveform data indicating a received light waveform of light received when it is determined that the measured turbidity rises above a threshold; and executing, by the processor, using the acquired waveform data as input, an identification process of identifying a type of substance mixed in the liquid to be measured to thereby acquire an identification result of the type of substance; and determining, by the processor, the type of substance with reference to the acquired identification result, wherein executing the identification process comprises:

executing, by the processor, a process of, upon receipt of input data indicating a received light waveform, identifying a type of substance corresponding to a waveform pattern of the received light waveform indicated by the input data with reference to a database that defines correspondence relationships between a plurality of waveform patterns and a type of substance mixed in a liquid through which light corresponding to each of the waveform patterns is transmitted; and acquiring, by the processor, data indicating the type of substance identified with reference to the database.

10. A method for a turbidimeter, comprising:

receiving, by a light receiving apparatus included in the turbidimeter, light through a liquid to be measured;

inputting, by the light receiving apparatus, data indicating a received light waveform of the received light to a control apparatus included in the turbidimeter, the control apparatus comprising a processor;

acquiring, by the processor, with use of multiple types of substances, waveform data indicating a corresponding received light waveform of light received through the liquid in which each type of substance is mixed;

associating, by the processor, for each type of substance, a waveform pattern of the corresponding received light waveform indicated by the acquired waveform data with type data indicating the each type of substance to create training data; and generating, by the processor performing machine learning using the created training data, a trained model that takes input data indicating a waveform pattern of a received light waveform as input and outputs data indicating a type of substance mixed in a liquid through which light corresponding to the waveform pattern of the received light waveform indicated by the input data is transmitted.

* * * * *